United States Patent
Starr et al.

(10) Patent No.: US 7,277,715 B2
(45) Date of Patent: Oct. 2, 2007

(54) METHODS, SYSTEMS, AND PRODUCTS FOR DEMOGRAPHIC DISCOUNTING

(75) Inventors: Robert J. Starr, Decatur, GA (US); Samuel N. Zellner, Dunwoody, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 9 days.

(21) Appl. No.: 11/200,963

(22) Filed: Aug. 10, 2005

(65) Prior Publication Data
US 2006/0223505 A1    Oct. 5, 2006

Related U.S. Application Data

(63) Continuation-in-part of application No. 11/095,362, filed on Mar. 31, 2005.

(51) Int. Cl.
*H04Q 7/20* (2006.01)
(52) U.S. Cl. .............. 455/456.1; 455/414.1; 705/14
(58) Field of Classification Search ............ None
See application file for complete search history.

(56) References Cited

U.S. PATENT DOCUMENTS

| | | | |
|---|---|---|---|
| 6,108,533 A | 8/2000 | Brohoff | |
| 6,169,894 B1 | 1/2001 | McCormick | |
| 6,199,045 B1 | 3/2001 | Giniger | |
| 6,529,159 B1 | 3/2003 | Fan | |
| 6,677,894 B2 | 1/2004 | Sheynblat | |
| 2003/0134648 A1 | 7/2003 | Reed | |
| 2005/0209921 A1* | 9/2005 | Roberts et al. | 705/14 |

* cited by examiner

*Primary Examiner*—Erika A. Gary
(74) *Attorney, Agent, or Firm*—Scott P. Zimmerman, PLLC; Geoff Sutcliffe; Jodi Hartman

(57) ABSTRACT

Methods, systems, and computer program products are disclosed for providing a discount to a device. One method obtains a location of the device and obtains a demographic indicator associated with the device. The discount is retrieved from memory, and the discount is based on the location and on the demographic indicator. The discount increases as a distance from a reference location increases. The reference location may represent any location, such as a physical location of a merchant. As the distance between the device and the merchant's physical location increases, the merchant provides a greater discount to entice the customer to travel to the merchant.

17 Claims, 15 Drawing Sheets

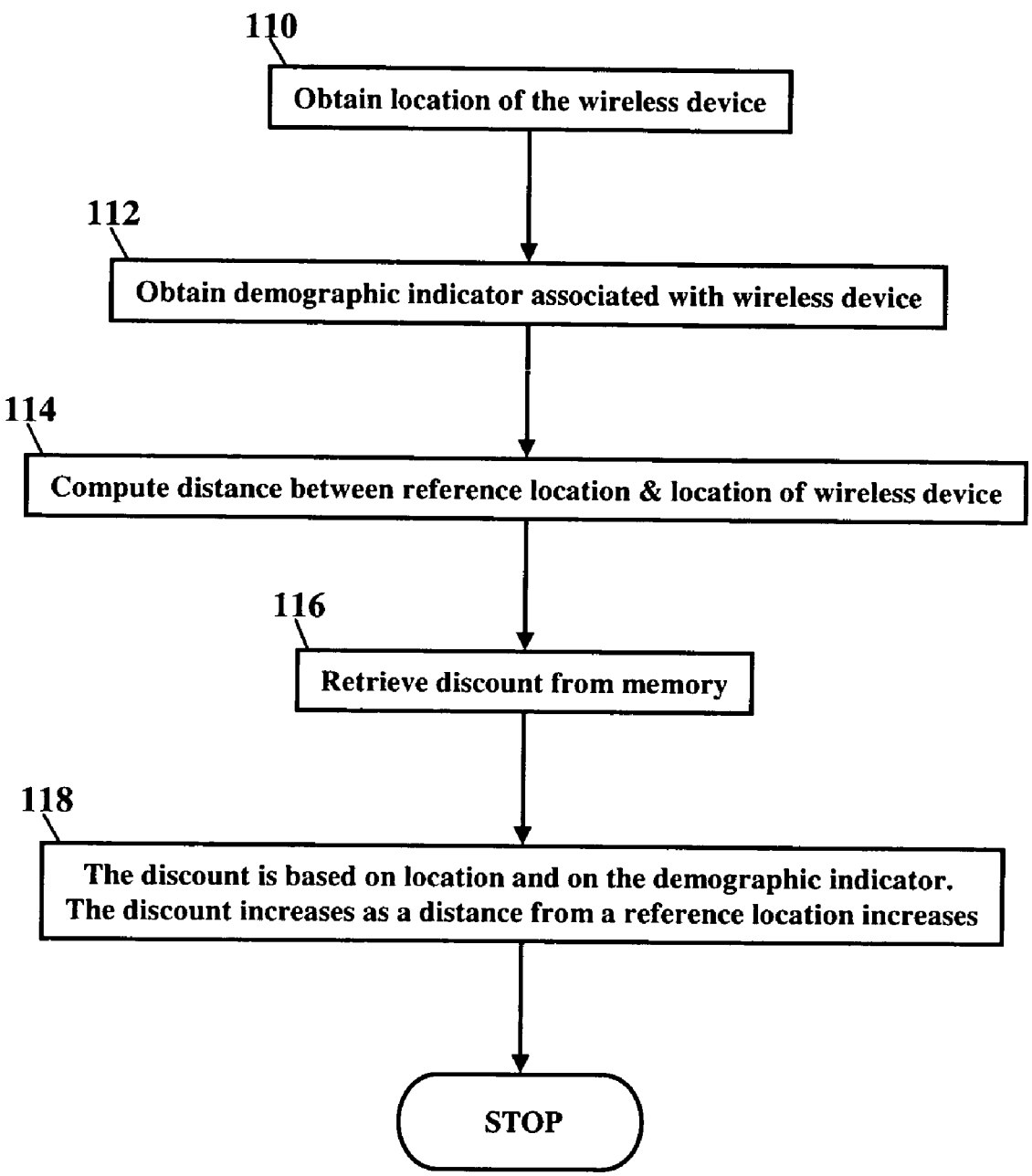

METHODS, SYSTEMS, AND PRODUCTS FOR DEMOGRAPHIC DISCOUNTING

CROSS-REFERENCE TO RELATED APPLICATIONS

This application is a continuation-in-part of U.S. application Ser. No. 11/095,362, filed Mar. 31, 2005 and entitled "Methods, Systems, and Products for Distance-Based Discounting," which is incorporated herein by reference in its entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

This application generally relates to telecommunications and to data processing. This application, more particularly, relates to location monitoring.

Location-based services are known in the art. A wireless device's location is determined (usually via triangulation or a global positioning system) and then information is provided based on that location. Advertising, for example, can be based on location. Once the location of a wireless device is known, local restaurants and merchants may wish to provide targeted advertising to the wireless device. Coupons may even be sent to the wireless device to entice the wireless customer to purchase.

Despite these known location-based services, a fundamental concept has eluded the prior art. As the customer travels further from a merchant, conventional advertising and marketing strategies are less successful. A wireless customer that is located farther away from a merchant is less likely to travel and to purchase from the merchant. That is, a wireless customer that is in the vicinity of a merchant's store is more likely to respond to the location-based advertisement. If the wireless customer is presently located many miles from the merchant, the location-based advertisement may not entice the wireless customer to drive to the merchant. What is needed, then, is a strategy for providing location-based services that provides a greater enticement depending on the distance a wireless customer must travel.

SUMMARY

The aforementioned problems, and other problems, are reduced, according to the exemplary embodiments, using discounts based on demographics and on geographic location. These discounts vary according to the demographics of the recipient and according to the distance from a reference location. A merchant, for example, may wish to offer discounts to demographically-targeted customers who must travel to the merchant's physical location. The merchant wishes to target certain demographics and to provide a greater discount to those customers who must travel a greater distance. The exemplary embodiments, therefore, describe concepts that provide a discount based on demographics (e.g., income, age, and/or gender) and on the distance between the customer's device and the merchant's physical location. As the customer's device travels further from the reference location (e.g., the merchant's physical location), the merchant provides a greater discount. The discount is meant to entice the customer to travel to the merchant's physical location and make purchases. The farther the customer must travel, the greater the discount the merchant provides.

Distance, however, is only one factor that may determine the appropriate discount. Once the location of the customer's device is known, the exemplary embodiments may acquire and use other information to determine whether a discount is necessary or even desirable. The exemplary embodiments, for example, may use demographic indicators to further determine whether a discount is desirable. One such demographic indicator, for example, is a billing address associated with the device. If the billing address has some attribute that indicates a wealthy demographic (such as a street address, a city, or a ZIP code), perhaps no discount is needed to entice the customer. Another demographic indicator may be household income. If a household income (associated with the wireless device or associated with a subscriber) exceeds some value or threshold, then a merchant may decline to offer a discount. The merchant, similarly, may demographically target subscribers whose household income is below a threshold value. The merchant may even provide greater discounts to those demographically-targeted customers who must travel a greater distance. As the following paragraphs will explain, the exemplary embodiments may also use historical location information and/or historical purchase information to determine if a discount is needed. The exemplary embodiments may also use information related to, or extrapolated from, gender, age, employment, education, or other demographic indicators to determine the discount.

According to the exemplary embodiments, methods, systems, and computer program products are disclosed for providing a discount to a device. A location of the device is obtained. A demographic indicator associated with the device is also obtained. The discount is retrieved from memory, and the discount is based on the location and on the demographic indicator. The discount increases as a distance from a reference location increases.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DESCRIPTION OF THE DRAWINGS

These and other features, aspects, and advantages of the embodiments of the present invention are better understood when the following Detailed Description is read with reference to the accompanying drawings, wherein:

FIG. 15 is a flowchart illustrating a method of providing a demographic discount to a wireless device.

DETAILED DESCRIPTION

Exemplary embodiments will now be described more fully hereinafter with reference to the accompanying drawings, in which exemplary embodiments are shown. The exemplary embodiments may, however, be embodied in many different forms and should not be construed as limited to the embodiments set forth herein. These embodiments are provided so that this disclosure will be thorough and complete and will fully convey the scope of the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art understand that the exemplary hardware, software, processes, methods, and/or operating systems described herein are for illustrative purposes and, thus, are not intended to be limited to any particular named manufacturer.

Figure 1:
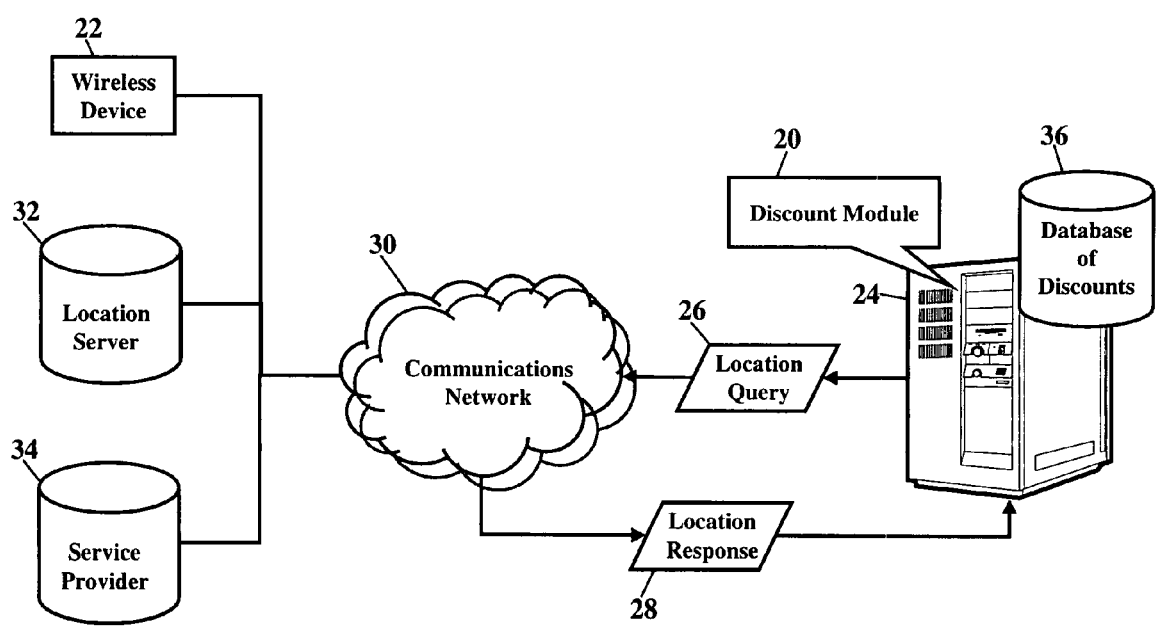
FIGS. 1-3 are schematics illustrating exemplary embodiments.
Figure 2:
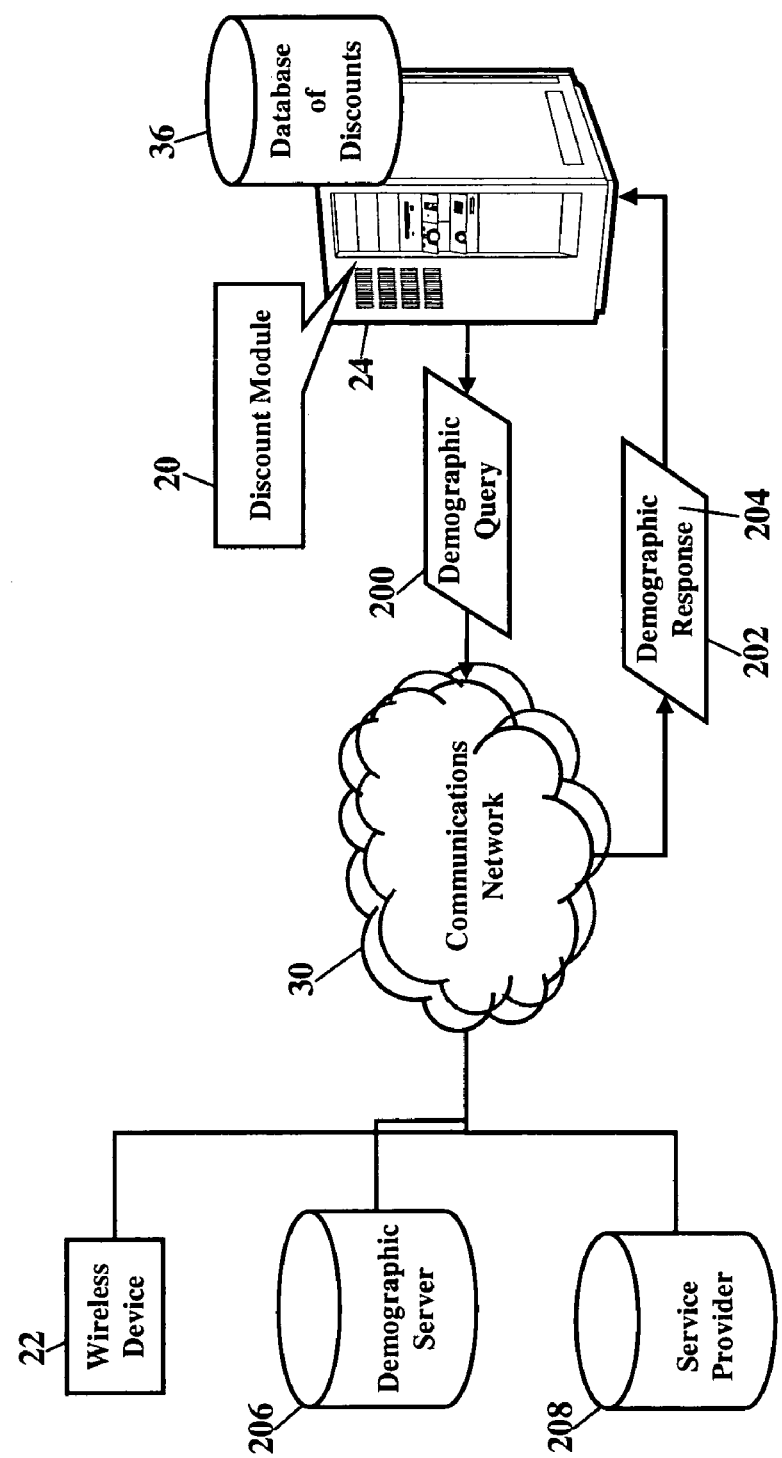
Figure 3:
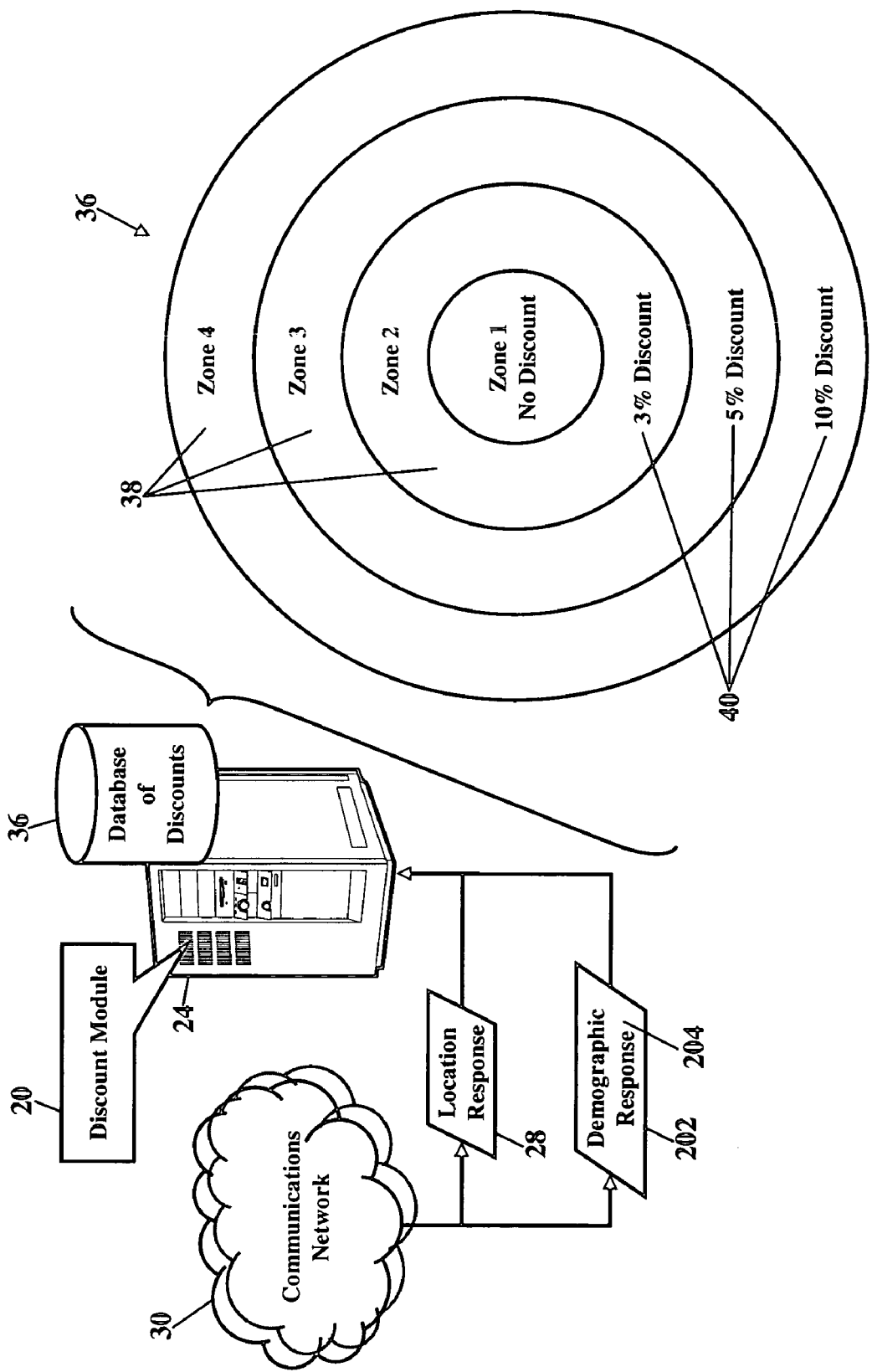

The exemplary embodiments describe methods, systems, and products for providing a discount to a wireless device. These discounts, however, are based on demographics and on geographic location. These discounts vary according to the demographics of the recipient and according to the distance from a reference location. A merchant, for example, may wish to offer discounts to demographically-targeted customers who must travel to the merchant's physical location. The merchant wishes to target certain demographics and to provide a greater discount to those customers who must travel a greater distance. The exemplary embodiments, therefore, describe concepts that provide a discount based on demographics (e.g., income, age, and/or gender) and on the distance between the customer's wireless device and the merchant's physical location. As the customer's wireless device travels further from the reference location (e.g., the merchant's physical location), the merchant provides a greater discount. The discount is meant to entice the wireless customer to travel to the merchant's physical location and make purchases. The farther the customer must travel, the greater the discount the merchant provides FIGS. 1-3 are schematics illustrating exemplary embodiments. FIG. 1 is a schematic illustrating a query to obtain the location of a wireless device. A discount module 20 comprises methods, systems, computer programs, and/or computer program products that provide a discount based on a location of a wireless device 22 and based on a demographic indicator associated with the wireless device 22. The discount module 20 operates within any computer system, such as a computer server 24. The discount module 20 issues a location query 26 to determine the location of the wireless device 22. The discount module 20 then receives a location response 28, and the location response 28 includes information that represents the location of the wireless device 22. The location response 28 may represent the current location of the wireless device 10, or the location response 28 may represent a recent location of the wireless device 10. Both the location query 26 and the location response 28 communicate via a communications network 30. The communications network 30 may be a distributed computing network, such as the Internet (sometimes alternatively known as the "World Wide Web"), an intranet, a local-area network (LAN), and/or a wide-area network (WAN). The communications network 30 may alternatively or additionally include a cable network operating in the radio-frequency domain and/or the Internet Protocol (IP) domain. The communications network 30, however, may also include portions of the Public Switched Telephone Network (PSTN). The communications network 30 may include coaxial cables, copper wires, fiber optic lines, and/or hybrid-coaxial lines. The communications network 30 may even include wireless portions utilizing any portion of the electromagnetic spectrum and any signaling standard (such as the various cellular standards CDMA, TDMA, GSM, and/or the I.E.E.E. 802 family of standards).

The discount module 20 obtains the location of the wireless device 22. The location query 26 may communicate to a location server 32. The location server 32 is a computer system and/or a database that stores location information for the wireless device 22. The location query 26 may additionally or alternatively communicate to a service provider 34 for the location of the wireless device 22. The location query 26 may additionally or alternatively query the wireless device 22 for its current or recent location. The location of the wireless device 22 may be determined using a global positioning system, triangulation, timed signals, and/or the Doppler effect. The Doppler effect describes motion between a time-harmonic source and a receiver, is known in the art, and thus will not be further explained. If the reader wishes to learn more about the Doppler effect, the reader is directed to DAVID K. CHENG, FIELD AND WAVE ELECTROMAGNETICS 360-361 (1990), incorporated herein by reference. How the location of the wireless device is determined is beyond the scope of this patent. Those of ordinary skill in the art recognize that various methods of locating the wireless device 22 are known and will not be further discussed.

The discount module 20 receives the location response 28 via the communications network 30. The location response 28 includes information that represents the location of the wireless device 22. The location response 28 may represent the current or a recent location of the wireless device 10. Once the location of the wireless device 22 is known, the discount module 20 then uses the location to retrieve the appropriate discount 36. The discount 36 is at least partly based on the location, such that the discount 36 increases as a distance from a reference location increases. When the reference location represents a merchant's physical location (e.g., a grocery store, a retailer's store, a movie cinema, etc.), the merchant provides the discount 36 based on the distance between the wireless device 22 and the merchant's physical location. As the wireless device 22 travels further from the reference location (e.g., the merchant's physical location), the merchant provides a greater discount. The discount 36 is meant to entice the wireless customer to travel to the merchant's physical location and make purchases. The farther the customer must travel, the greater the discount the merchant provides.

FIG. 2 is a schematic illustrating a query to obtain a demographic associated with the wireless device 22. Once the location of the wireless device 22 is known, the discount module 20 then issues a demographic query 200 to acquire one or more demographic indicators associated with the wireless device 22. The discount module 20 then receives a demographic response 202, and the demographic response 202 includes information that represents a demographic indicator 204 associated with the wireless device 22. The demographic response 202 may represent some demographic indicator 204 associated with the wireless device 22. The demographic indicator 204 may represent some information that indicates a demographic of a subscriber or user associated with the wireless device. The demographic indicator 204 may represent an address, income, gender, age, nationality, employment, education, or any other information that helps tailor the discount 36 to potential customers.

Both the demographic query 200 and the demographic response 202 are communicated via the communications network 30. The demographic query 200 may be communicated to a demographic server 206. According to an exemplary embodiment, the demographic server 206 is a computer system and/or a database that stores demographic information related to the wireless device 22. The demographic query 200 may additionally or alternatively communicate to a service provider 208 for the demographic indicator associated with the wireless device 22. The demographic query 200 may additionally or alternatively query the wireless device 22 for the demographic indicator 204 self-stored in the wireless device 22.

The demographic response 202 describes the demographic indicator 204. The demographic response 202, for example, may describe an address associated with the wireless device 22. The address may be a billing address of a subscriber, a current address of the wireless device 22, or any other address associated with the wireless device 22. The address may be any of a house/building number, a street name, a city, a state, a ZIP code, and/or a country. The demographic response 202 may additionally or alternatively describe an income associated with the wireless device. The income may be that of the subscriber, the subscriber's spouse and/or children, and/or the subscriber's household income. The income may also be a business revenue/income associated with the subscriber. The demographic response 202 may additionally or alternatively describe a gender associated with the wireless device, such as the subscriber's gender, the subscriber's partner's gender, and/or the subscriber's children's gender. The term "gender" may even include pets associated with the subscriber.

FIG. 3 is a schematic illustrating geographic zones 38, according to exemplary embodiments. The discount module 20 determines which zone represents the location of the wireless device. The discount module 20 then analyzes the demographic indicator 204 (from the demographic response 202) and retrieves the corresponding discount 40. The corresponding discount 40 is related to both the geographic zone 38 and to the demographic indicator 204. Each zone and demographic indicator corresponds to a particular discount. When the reference location corresponds to a merchant's physical location, those zones that are further from the merchant's store may be assigned a greater discount. The discount 36 is based on the location and on the demographic indicator, such that the discount 36 increases as the distance from the merchant's store increases. As the wireless device (shown as reference numeral 22 in FIG. 1) travels further from the reference location (e.g., the merchant's physical location), the merchant provides a greater discount. The discounts 40 entice the wireless customer to travel to the merchant's physical location and make purchases. The farther the customer must travel, the greater the discount.

Figure 4:
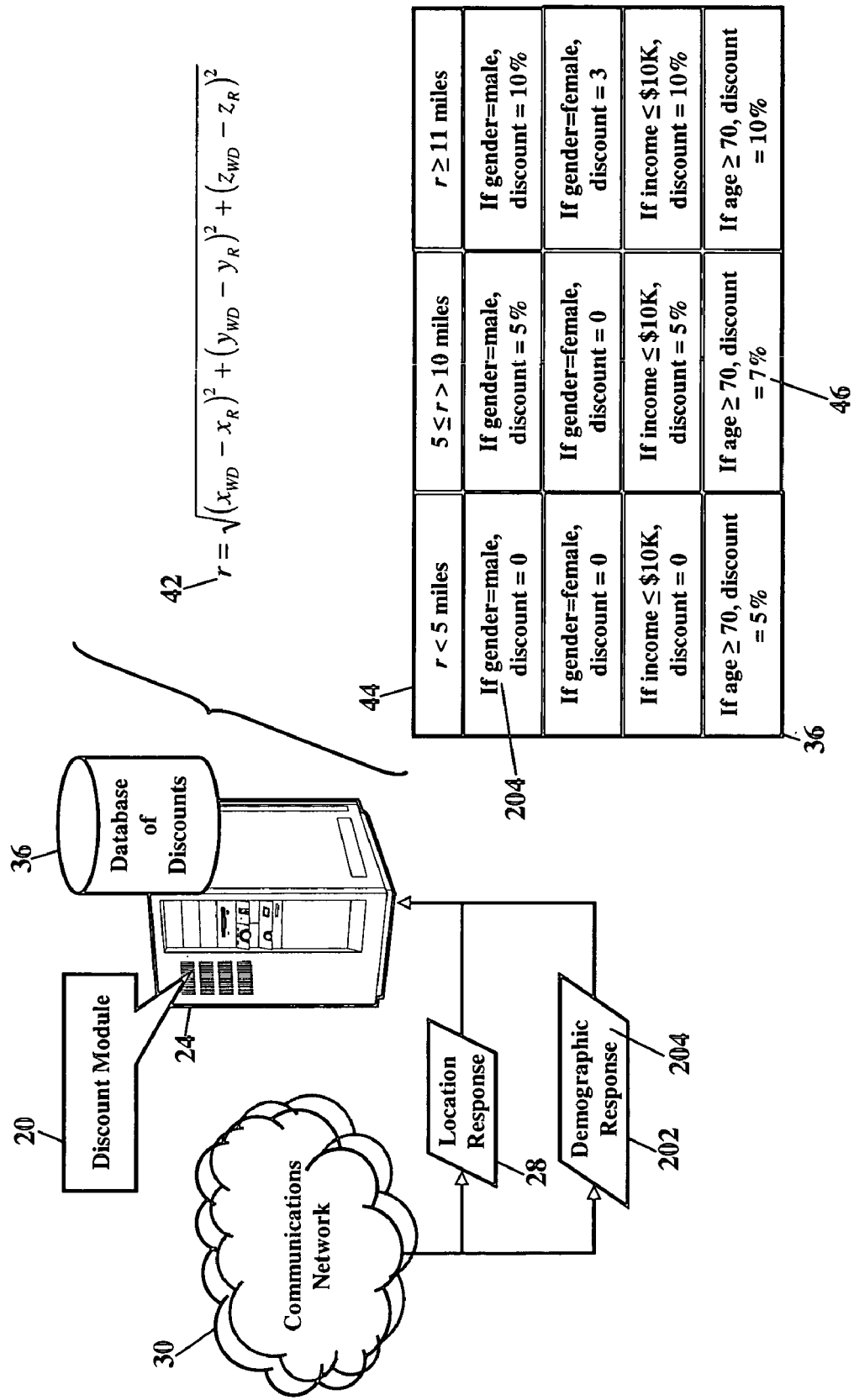
FIG. 4 is a schematic illustrating retrieval of a discount, according to exemplary embodiments.

FIG. 4 further illustrates retrieval of the discount 36. Here the discount module 20 computes a distance r (shown as reference numeral 42) between the reference location and the location of the wireless device. The location of the reference location is represented by the coordinates ($x_R$, $y_R$, $z_R$). The location of the wireless device is represented by the coordinates ($x_{WD}$, $y_{WD}$, $z_{WD}$). The coordinates may be grid coordinates. The coordinates may be latitude, longitude, and elevation (such as altitude or azimuth). The coordinates may be expressed in any x, y, and z coordinate value. These coordinates may be expressed in U.S. Customary and British Imperial units, such as feet and miles, or in metric units, such as meters and kilometers. The coordinates could also be expressed as position, velocity, and time coordinates. However the coordinates are expressed, the discount module 20 computes the distance r between the corresponding coordinates. Although many methods may be used to compute the distance r, the distance r may be simply computed using $$r=\sqrt{\Delta x^2+\Delta y^2+\Delta z^2}.$$

See FRANCIS W. SEARS ET AL., UNIVERSITY PHYSICS 10-11 (1976). Substituting the respective coordinates, the distance r between the reference location and the location of the wireless device may be computed using $$r=\sqrt{(x_{WD}-x_R)^2+(y_{WD}-y_R)^2+(z_{WD}-z_R)^2}.$$

FIG. 4 also illustrates a data table 44. The data table 44 maps the distance r (between the reference location and the location of the wireless device) and the demographic indicator 204 to a corresponding discount 46. Once the discount module 20 computes the distance r (shown as reference numeral 42) and receives the demographic indicator 204, the discount module 20 consults the data table 44 and retrieves the appropriate discount 46. Again, as the wireless device (shown as reference numeral 22 in FIG. 1) travels further from the reference location (e.g., the merchant's physical location), the merchant provides a greater discount to those people matching the demographic conditions. The discounts 46 entice the wireless customer to travel to the merchant's physical location and make purchases. The farther the customer must travel, the greater the discount.

Discounts based on demographics and on distance have many applications. Suppose a luxury retailer wants to entice wealthy customers to travel to the retailer and to make purchases. The luxury retailer could target wealthy individuals using a billing address associated with the wireless device, such that predetermined streets or cities are more likely to contain wealthy individuals. The luxury retailer could alternatively or additionally obtain automotive information from a motor vehicle registry, such as a state's licensing agency or department of motor vehicles. The luxury retailer could target all individuals who registered owners of BMW, Cadillac, Ferrari, Rolls Royce, and other high-end vehicles. The luxury retailer could also obtain demographic indicators from a local government's property records database. Many counties provide online access to property tax records. The luxury retailer could target individuals having a purchase price for a home that exceeds some value or threshold. The luxury retailer could target individuals that pay cash for a home. The luxury retailer could target individuals having a large lot or even acreage in suburban areas, indicating these owners may be inclined to build an estate-like residence. Whatever the demographic indicator 204, and however it is obtained, the luxury retailer can use the demographic indicator 204 to tailor discounts to potential customers. The demographic indicator 204 acts as a filter to further refine those wireless customers who receive a distance-based discount.

The demographic indicator 204 can be a great tool for retailers. The demographic indicator 204 may help merchants uniquely target customers most likely to respond to the merchant's discount. Suppose an automotive repair facility wants to target wireless customers who most likely need automotive services. The automotive repair facility could target all individuals owning a car or truck that is more than four (4) years old. The automotive repair facility may assume that newer cars are covered under a manufacturer's warranty, so there is little or no success in sending discounts to warranty vehicles. The automotive repair facility, instead, wants to target owners of late-model cars that are not covered by a manufacturer's warranty. The automotive repair facility could obtain automotive information from a state's online motor vehicle registry, filtering out those owners of cars that are three years or newer. The automotive repair facility could then target discounts to the owners of older cards, based on the distance the customer travels to the automotive repair facility.

The exemplary embodiments may be used effectively thwart sales to competitors. Because the discount module 20 may obtain the current location of the wireless device 22, the discount module 20 may inform a merchant when the wireless device 22 enters a competitor's facility. The merchant may then tactically authorize a discount to the wireless device. The merchant may make the discount so enticing as to thwart a sale at the competitor. Suppose, for example, the wireless device 22 enters a LOWE'S® Home Improvement store (LOWE'S® is a registered trademark of Lowe's Companies, Inc., P.O. Box 1111, North Wilkesboro, N.C. 28656-0001). The discount module 20 informs the competing retailer HOME DEPOT® (© 2004 Homer TLC, Inc.). The retailer HOME DEPOT® may decide to immediately authorize a discount to thwart any potential sale at LOWE'S®. The discount module 20 then retrieves and communicates the discount 46 to the wireless device 22. The discount 46 may be valued such that the customer leaves the LOWE'S® and, instead, drives to HOME DEPOT® and makes purchases. A ten percent (10%) discount, for example, may thwart the potential sale at the competitor and, instead, entice the customer to leave and drive to the competitor's store.

Figure 5:
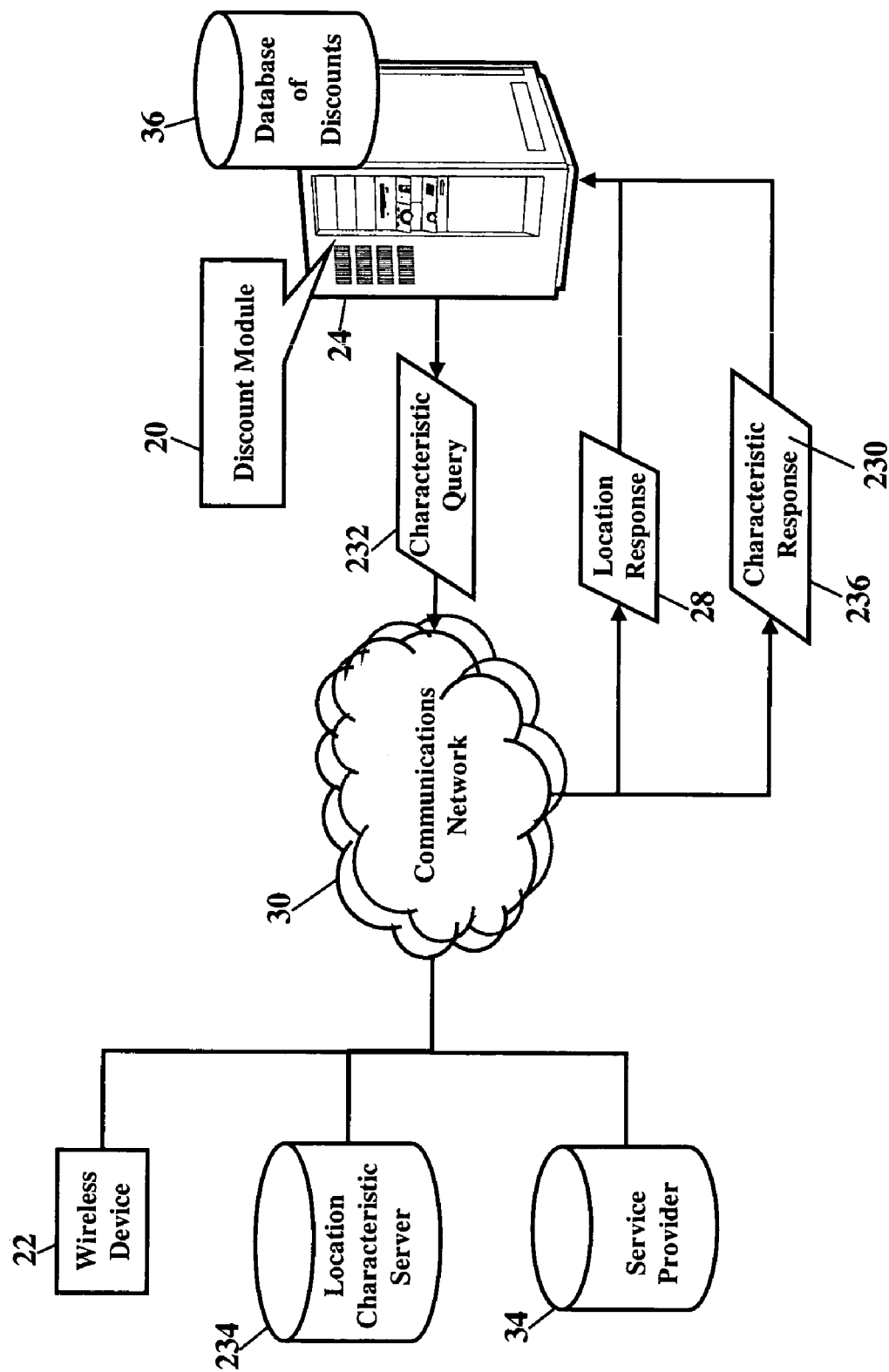
FIG. 5 is a schematic illustrating a characteristic of a location, according to exemplary embodiments.

FIG. 5 is a schematic illustrating a characteristic 230 of the location, according to exemplary embodiments. Once the location of the wireless device 22 is known (represented by the location response 28), the discount module 20 may also query for characteristics of that location. The discount may then be based at least partly on the characteristics of location. If, for example, the wireless device 22 is currently located Paris, France, the subscriber may wish to receive discounts for restaurants in the vicinity. The subscriber may wish to receive a discount for a travel book at a local bookstore. Tour guides, museums, and other attractions may wish to communicate a discount to the wireless device. FIG. 5, then, illustrates the discount module issuing a characteristic query 232 to a location characteristic server 234. The location characteristic server 234 stores characteristics associated with locations. The characteristics may include any information, merchants, businesses, attractions, services, or persons who wish to be associated with a particular location. The discount module 20 receives a characteristic response 236, and the characteristic response 236 includes information representing the one or more characteristics 230 associated with the location coordinates. The discount module 20 then retrieves the discount based on the location, on the demographic indicator, and on the characteristic of the location.

Figure 6:
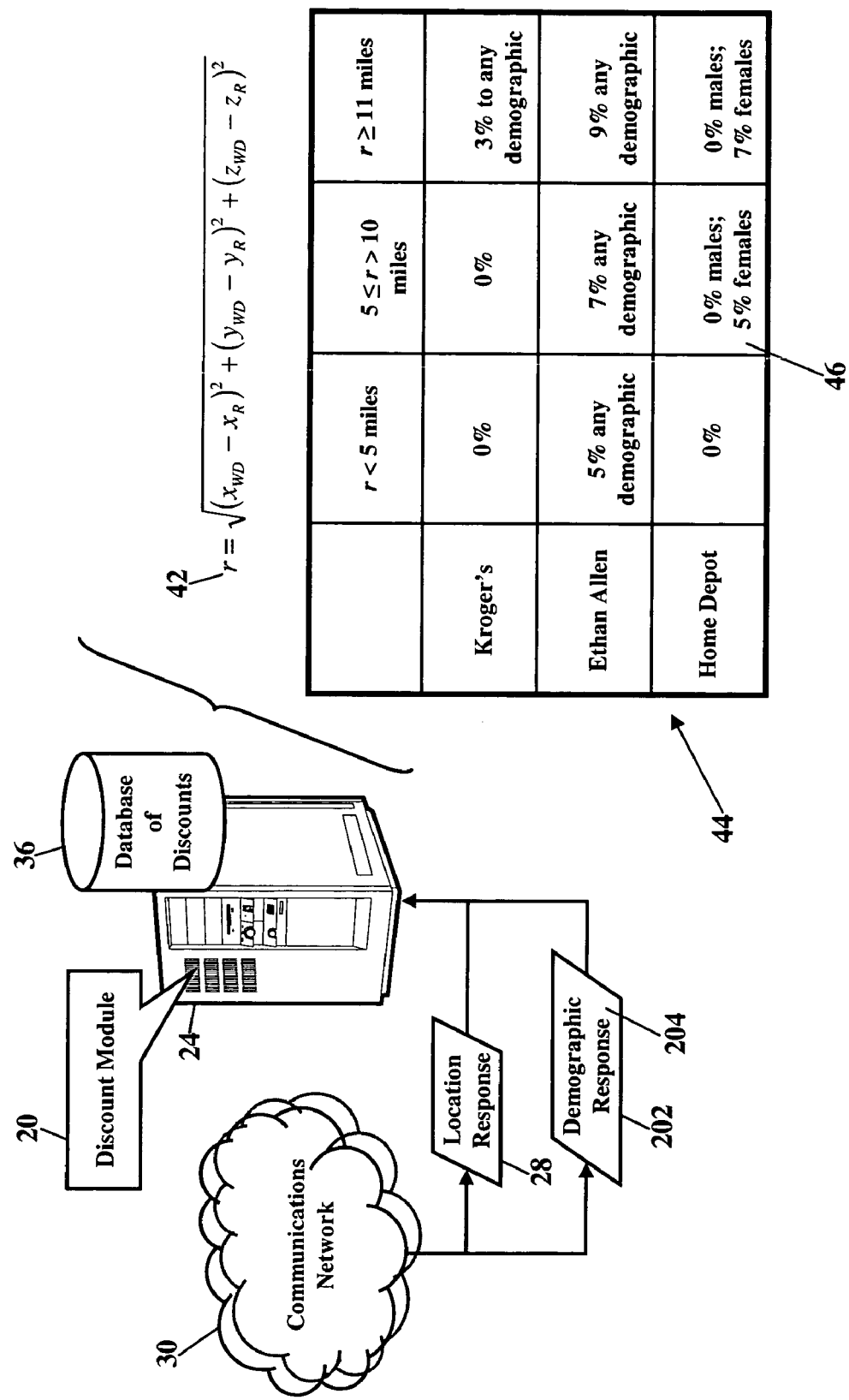
FIG. 6 is another schematic illustrating retrieval of discounts for multiple reference locations, according to exemplary embodiments.

FIG. 6 is another schematic illustrating retrieval of discounts. FIG. 6 is similar to FIG. 4, although FIG. 6 illustrates that discounts may be retrieved for multiple reference locations. Here the data table 44 illustrates discounts for multiple merchants, with each discounting depending upon the demographics associated with the wireless device and depending upon the distance. When the discount module 20 obtains the location of the wireless device (via the location response shown as reference numeral 28 in FIG. 1), the discount module 20 computes the distance r between multiple reference locations and the location of the wireless device. Using the previous examples, multiple merchants may provide discounts based on distance and based on demographics. The discount module 20 obtains the computes the distance r to each merchant's physical location. The discount module 20 then consults the data table 44 and retrieves the appropriate discount 46 for each merchant. This example lends itself to a cluster of merchants, such as shopping mall, which want to entice the wireless customer to travel and to make purchases. Some demographics may receive a greater discount, depending upon the distance they must travel.

Figure 7:
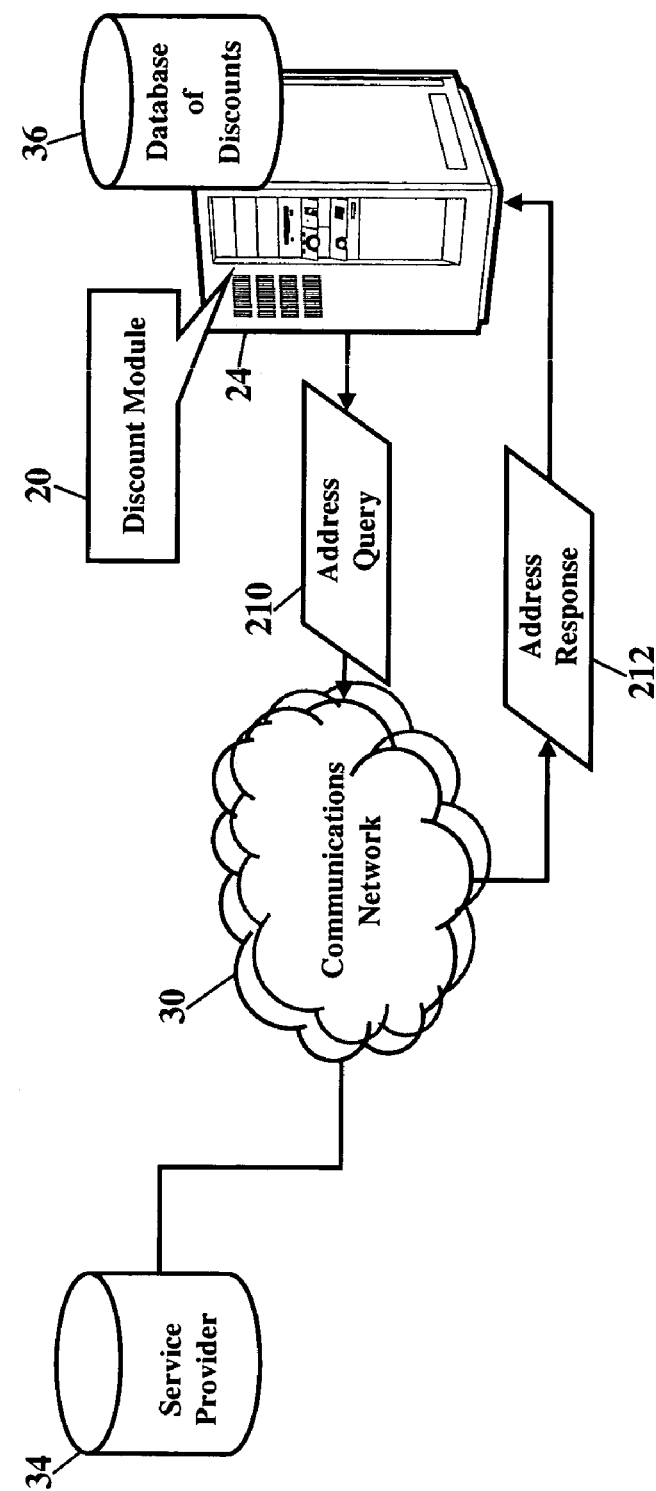
FIG. 7 is another schematic illustrating retrieval of discounts at least partly associated with an address, according to exemplary embodiments.

FIG. 7 is another schematic illustrating retrieval of discounts. Here, however, the discounts are at least partly associated with an address associated with the wireless device. When the discount module 20 issues the location query (shown as reference numeral 26 in FIG. 1) to determine the location of the wireless device 22, the discount module 20 also issues an address query 210. The address query 210 communicates via the communications network 30 to the service provider 34 for an address associated with the wireless device 22. The address query 210 may additionally or alternatively communicate via the communications network 30 to the wireless device 22 itself, wherein the wireless device 22 self-provides the address. However the address is obtained, an address response 212 is received. The address response 212 contains information that represents the address associated with the wireless device 22.

Now that an address is known, the address may be used to determine if a discount is needed. If the address has a particular zip code, street address, or city, that information can be used to demographically select the discount. If, for example, the address indicates a wealthy demographic, perhaps no discount is needed to entice the wireless customer. If, on the other hand, the address indicates a less affluent demographic, the current location information may be discounted, or even discarded, when retrieving the discount. A domestic worker, such as a housekeeper or groundskeeper, may have a wealthy current location, however, a needy billing address. The merchant may thus elect to provide a discount based partly, or even solely, on the distance between the billing address and the merchant's physical location.

The address may also be used to decline a discount. When the address indicates a wealthy demographic, as mentioned above, no discount may be needed to entice the wireless customer. If, however, the address is close to a competitor's store, the merchant may determine that the discount has little effect. Perhaps the wireless customer will always shop the competitor's closer location, so only an unusually large discount would entice the customer. Moreover, the necessary discount may erase any profitability, and/or the expense of offering the discount is greater that the potential profit. For whatever reason(s), the address may be used to decline a discount.

Figure 8:
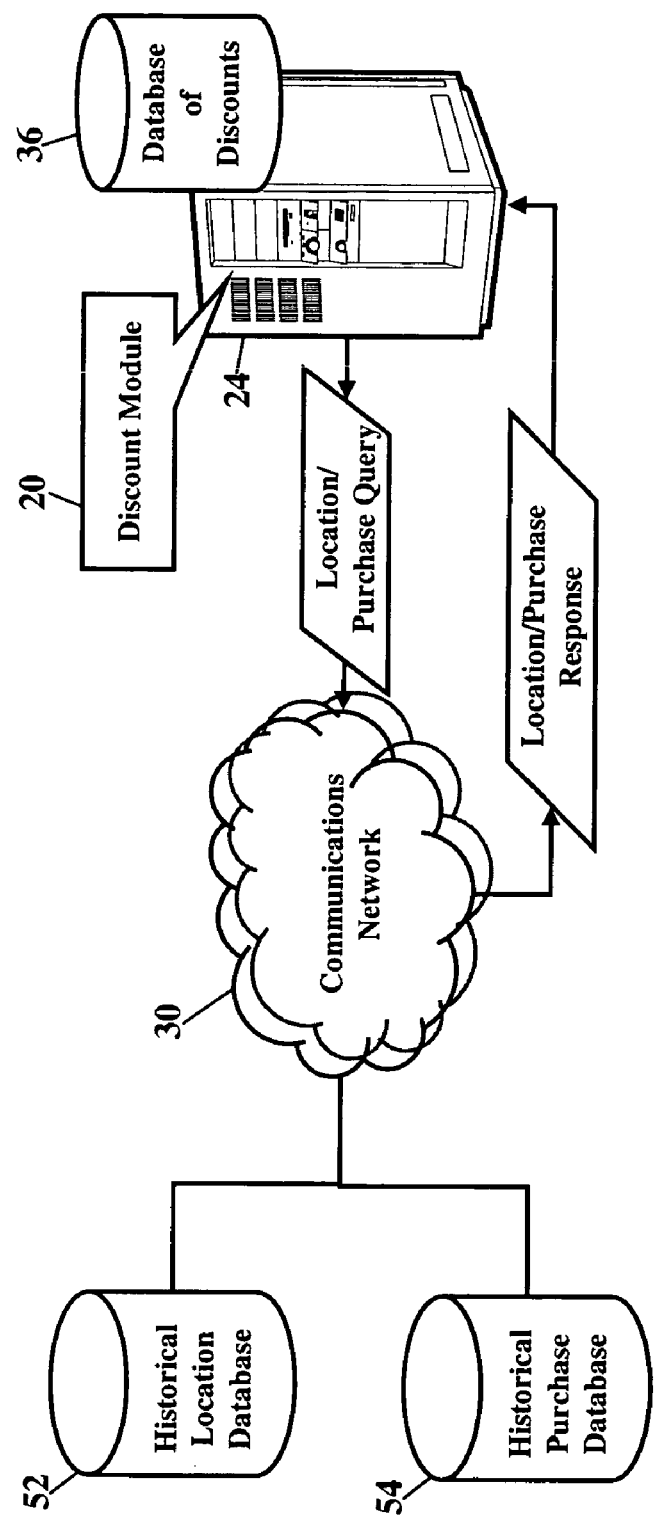
FIG. 8 is another schematic illustrating retrieval of discounts at least partly associated with historical location information and/or historical purchase information, according to exemplary embodiments.

FIG. 8 is another schematic illustrating retrieval of discounts. Here, however, the discounts are at least partly associated with historical location information and/or historical purchase information. If the wireless device has before been in the merchant's store, that historical location information may be useful to the merchant. That historical location information may be used to identify the customer's purchasing trends. Similarly, the customer's historical purchase information may indicate purchasing trends. If the wireless device's historical location information indicates a frequent customer, perhaps no discount, or a smaller discount, is desired. Likewise, the historical purchase information may indicate a frequent customer, so the merchant's discount strategy may change.

FIG. 8, then, illustrates obtaining historical location information and/or historical purchase information associated with the wireless device (shown as reference numeral 22 in FIG. 1). When the discount module 20 receives the location response (shown as reference numeral 28 in FIG. 1) (representing the location of the wireless device 22), the discount module 20 may also query a historical location database 52 and/or a historical purchase database 54. The historical location database 52 stores information representing a proximity of the wireless device to the reference location. The historical location database 52 stores one or more occasions when a location of the wireless device matches, or is within a predetermined range, of the reference location. The historical purchase database 54 stores information representing historical purchases associated with the wireless device, the address, and/or the wireless customer. By querying one or both of these databases, the merchant can refine their pricing strategy based on each individual customer.

Figure 9:
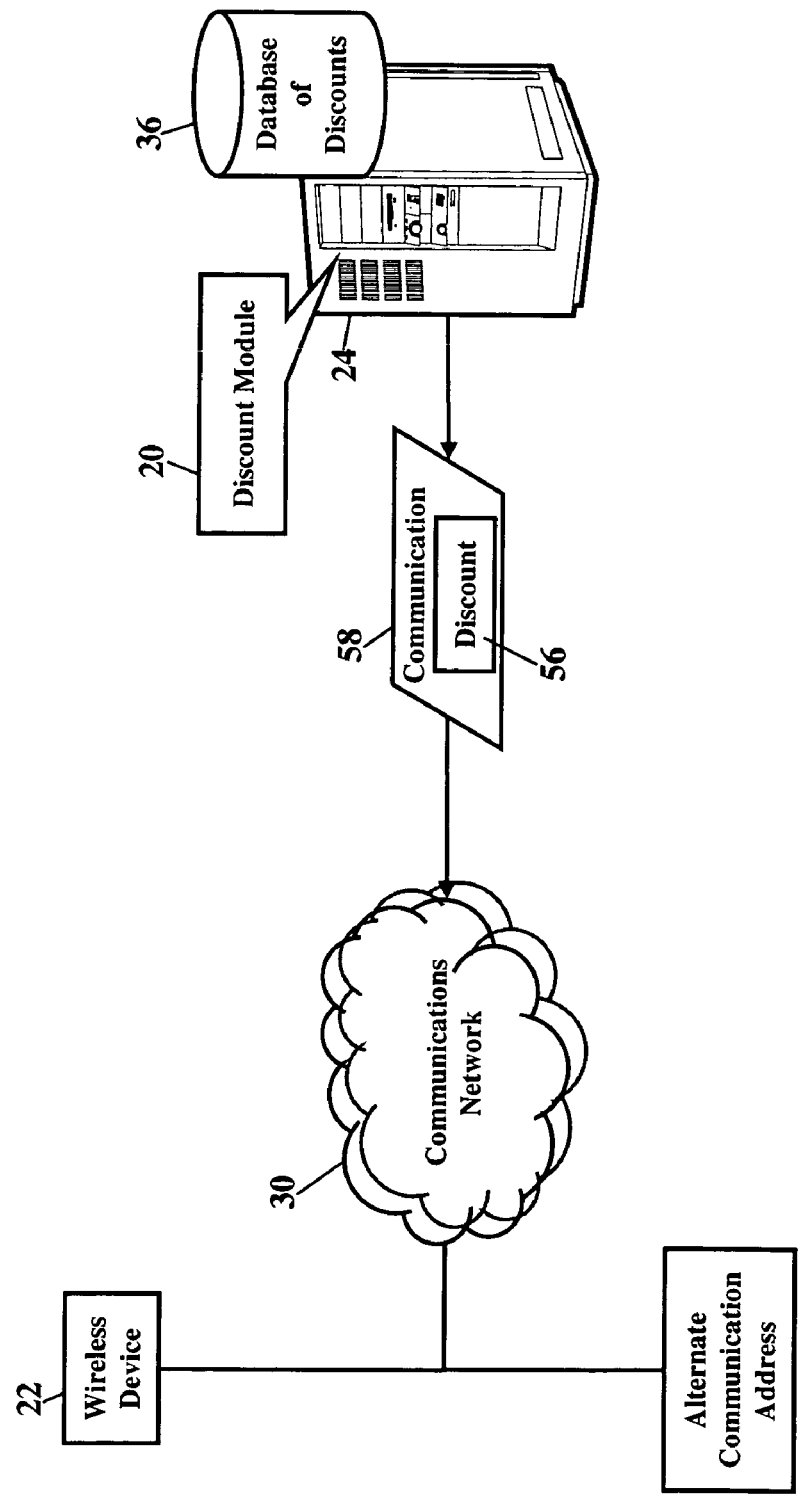
FIG. 9 is a schematic illustrating delivery of the discount, according to exemplary embodiments.

FIG. 9 is a schematic illustrating delivery of the discount, according to exemplary embodiments. Once the appropriate discount is retrieved, the discount module 20 then communicates that discount 56 to the customer. The discount module 20 addresses a communication 58 to the customer. The communication 58 contains the retrieved discount. (If the discount module determines that no discount is necessary, then perhaps no communication is needed.) The communication 58 may be an email, a text message, an instant message, a telephone call, and/or an Internet Protocol telephone call. The communication 58 may communicate via the communications network 30 to the wireless device 22. The communication 58, however, may additionally or alternatively communicate via the communications network 30 to an alternate communications address associated with the wireless customer and/or the wireless device (such as an email account, a pager address, or a telephone number). The communication 58 may also include a direct mail solicitation to the billing address associated with the wireless device.

Figure 10:
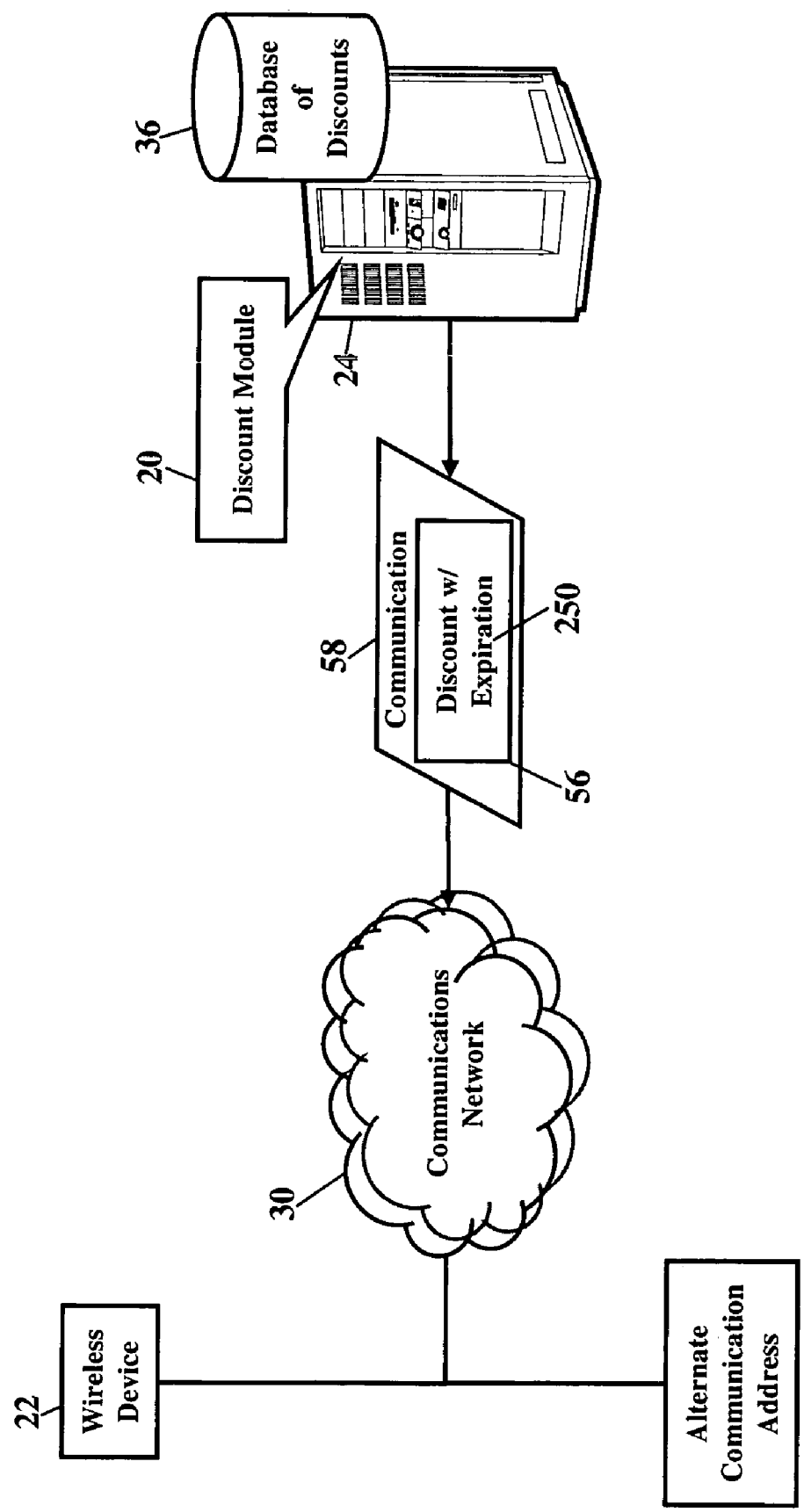
FIG. 10 is a schematic illustrating expiration of discounts, according to exemplary embodiments.

FIG. 10 is a schematic illustrating an expiration 250 of discounts, according to exemplary embodiments. Once the appropriate discount is retrieved, the discount module 20 then communicates that discount 56 to the customer. Here, however, the discount 56 expires after a predefined time. The expiration 250 may be chosen to effectively incentivize the subscriber to make purchases. If the discount expires within minutes, the subscriber may feel a sense of urgency and rush to make purchases. If the discount expires after a certain number of days, then the subscriber may delay those purchases to a more convenient time. The merchant may thus adjust sales revenue based upon the expiration 250. A quickly expiring discount may provoke a short term surge in sales, while a longer lasting discount would produce a steady increase in sales. The expiration 250 may even be tied to an inventory management system to ensure adequate inventory is on hand to meet sales.

Figure 11:
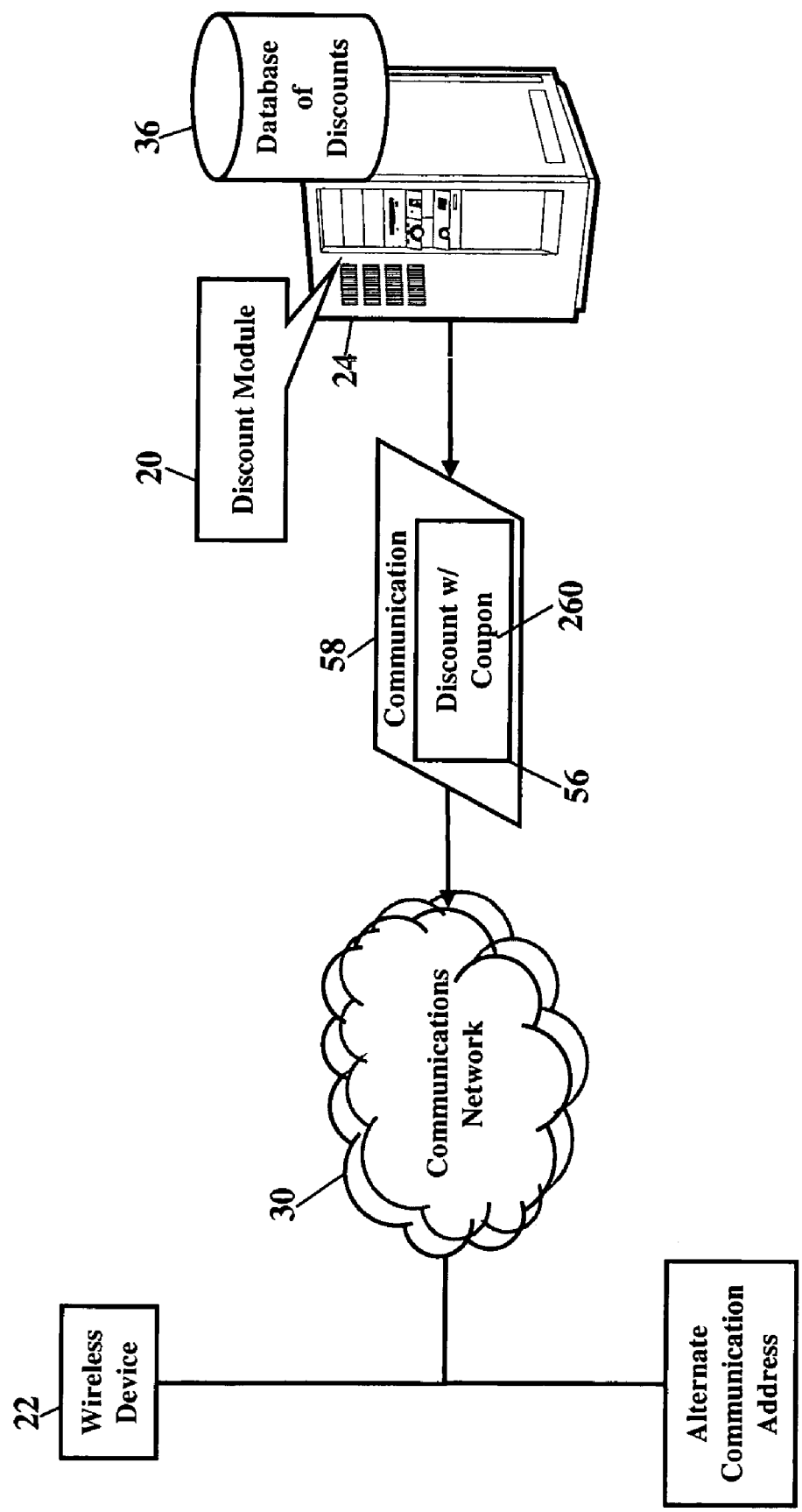
FIG. 11 is a schematic illustrating a coupon, according to exemplary embodiments.

FIG. 11 is a schematic illustrating a coupon 260, according to exemplary embodiments. Once the appropriate discount is retrieved, the discount module 20 then communicates that discount 56 to the customer. Here, however, the discount 56 comprises a coupon 260. The coupon 260 may be interactive, requiring some action on behalf of the subscriber associated with the wireless device 22. The interactive coupon 260, for example, may require the subscriber answer some marketing-related questions. The coupon 260 may require a test drive of a new car. The coupon 260 may require the subscriber purchase a particular product to receive the discount. The coupon 260 may include any conditions or requirements before the discount 56 may be applied to a purchase. The coupon 260 may also relate to the location of the wireless device 22, such as a coupon for reduced theater tickets in Paris (as explained above).

Figure 12:
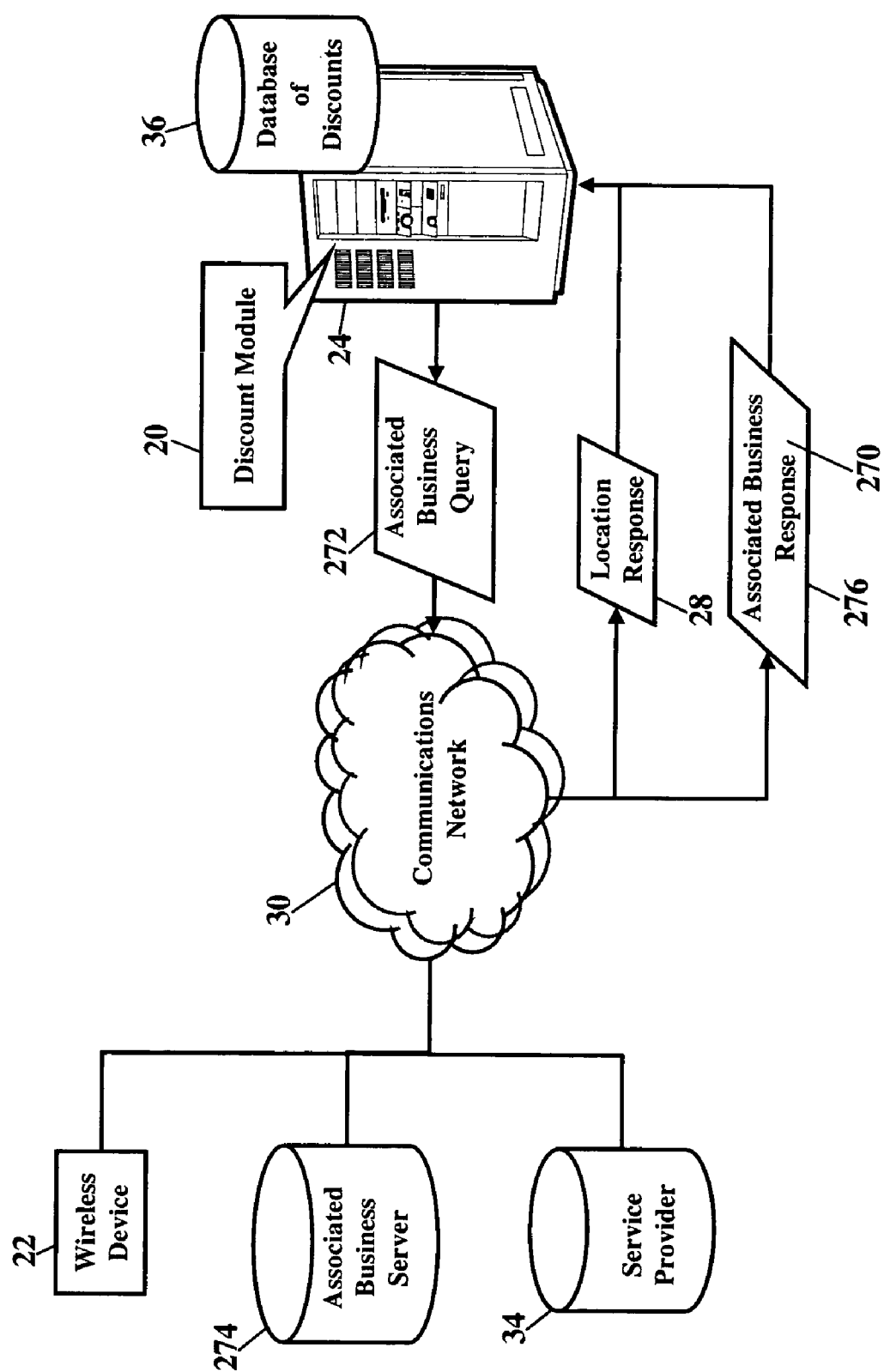
FIG. 12 is a schematic illustrating an associated business entity, according to exemplary embodiments.

FIG. 12 is a schematic illustrating an associated business entity 270, according to exemplary embodiments. Here the discount module 20 provides a discount to related businesses of a merchant. Once the location of the wireless device 22 is known (represented by the location response 28), the discount module 20 may also query for related businesses, entities, or affiliates. Discounts may then be offered to those related businesses, entities, or affiliates. Suppose, for example, the wireless device 22 is currently located in a HOME DEPOT© store. Once the discount module 20 obtains this location, the discount module 20 would then offer discounts to other businesses that are affiliated with HOME DEPOT©. The subscriber, for example, may receive a discount or coupon for an EXPO© store that is affiliated with the corporate parent. SEARS® and KMART®, as another example, may offer discounts or coupons to wireless customers. Even businesses that are not corporately related may cooperate and offer discounts for wireless customers. Restaurants and department stores, for example, may choose to target demographically similar customers by mutually sending discounts/coupons based on location. Theme parks and hotels could mutually target customers based on location. If a wireless customer enters the theme park, the theme park may send a coupon to entice the customer to book a hotel room.

FIG. 12, then, illustrates the discount module 20 issuing an associated business query 272 to an associated business server 274. The associated business server 274 stores related businesses, persons, and entities. The discount module 20 receives an associated business response 276, and the associated business response 276 includes information representing the an associated business entity 270. The discount module 20 then retrieves the discount based on the related business.

Figure 13:
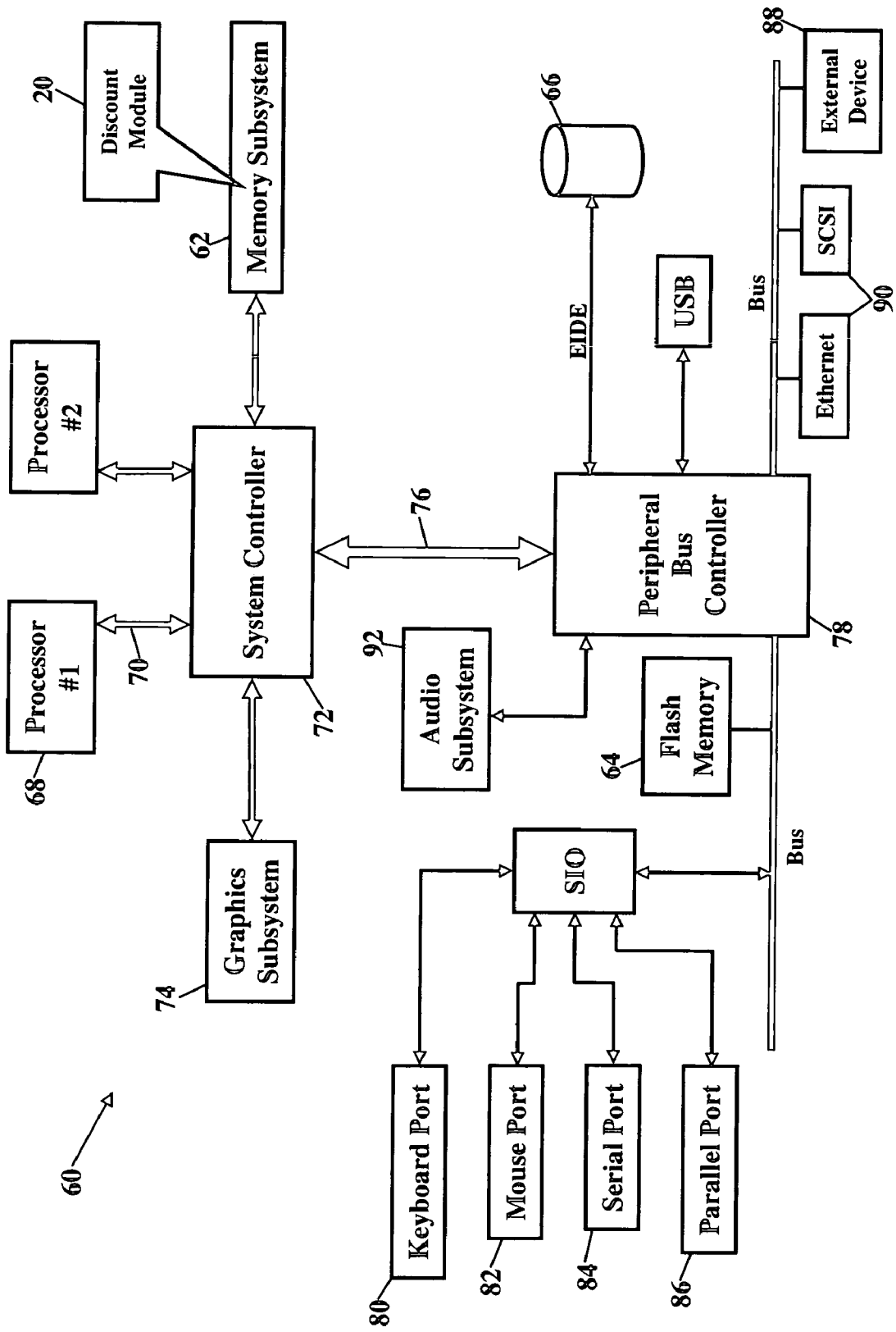
FIG. 13 depicts another possible operating environment for the exemplary embodiments.

FIG. 13 depicts another possible operating environment for the exemplary embodiments. FIG. 13 is a block diagram showing the discount module 20 residing in a computer system 60. The computer system 60 may be any computing system, such as the computer server (shown as reference numeral 24 in FIGS. 1-12), an IP network element such as an IP router/switch/hub/gateway/proxy, or any other computer device. As FIG. 13 shows, the discount module 20 operates within a system memory device. The discount module 20, for example, is shown residing in a memory subsystem 62. The discount module 20, however, could also reside in flash memory 64 or a peripheral storage device 66, or in firmware or hardware, or in any combination. The computer system 60 also has one or more central processors 68 executing an operating system. The operating system,.as is well known, has a set of instructions that control the internal functions of the computer system 60. A system bus 70 communicates signals, such as data signals, control signals, and address signals, between the central processor 68 and a system controller 72 (typically called a "Northbridge"). The system controller 72 provides a bridging function between the one or more central processors 68, a graphics subsystem 74, the memory subsystem 62, and a PCI (Peripheral Controller Interface) bus 76. The PCI bus 76 is controlled by a Peripheral Bus Controller 78. The Peripheral Bus Controller 78 (typically called a "Southbridge") is an integrated circuit that serves as an input/output hub for various peripheral ports. These peripheral ports are shown including a keyboard port 80, a mouse port 82, a serial port 84 and/or a parallel port 86 for a video display unit, one or more external device ports 88, and networking ports 90 (such as SCSI or Ethernet). The Peripheral Bus Controller 78 also includes an audio subsystem 92. Those of ordinary skill in the art understand that the program, processes, methods, and systems described in this patent are not limited to any particular computer system or computer hardware.

Those of ordinary skill in the art also understand that the central processor 68 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described herein are not limited to any particular manufacturer's central processor.

A preferred operating system, according to an exemplary embodiment, is the UNIX® operating system (UNIX® is a registered trademark of the Open Source Group, www.opensource.org). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, N.C., 1-888-733-4281, www.redhat.com). Other operating systems, however, are also suitable. Such other operating systems would include a WINDOWS-based operating system (WINDOWS® is a registered trademark of Microsoft Corporation, One Microsoft Way, Redmond Wash. 98052-6399, 425.882.8080, www.Microsoft.com). and Mac® OS (Mac® is a registered trademark of Apple Computer, Inc., 1 Infinite Loop, Cupertino, Calif. 95014, 408.996.1010, www.apple.com). Example operating systems of IP network elements including IP routers/switches/hubs/gateways/proxies include Cisco IOS (Internet Operating System), Vxworks, various proprietary OS's, and variations of UNIX. Those of ordinary skill in the art again understand that the program, processes, methods, and systems described herein are not limited to any particular operating system.

The system memory device (shown as memory subsystem 62, flash memory 64, or peripheral storage device 66) may also contain an application program. The application program cooperates with the operating system and with a video display unit (via the serial port 84 and/or the parallel port 86) to provide a Graphical User Interface (GUI). The Graphical User Interface typically includes a combination of signals communicated along the keyboard port 80 and the mouse port 82. The Graphical User Interface provides a convenient visual and/or audible interface with a user of the computer system 60.

Figure 14:
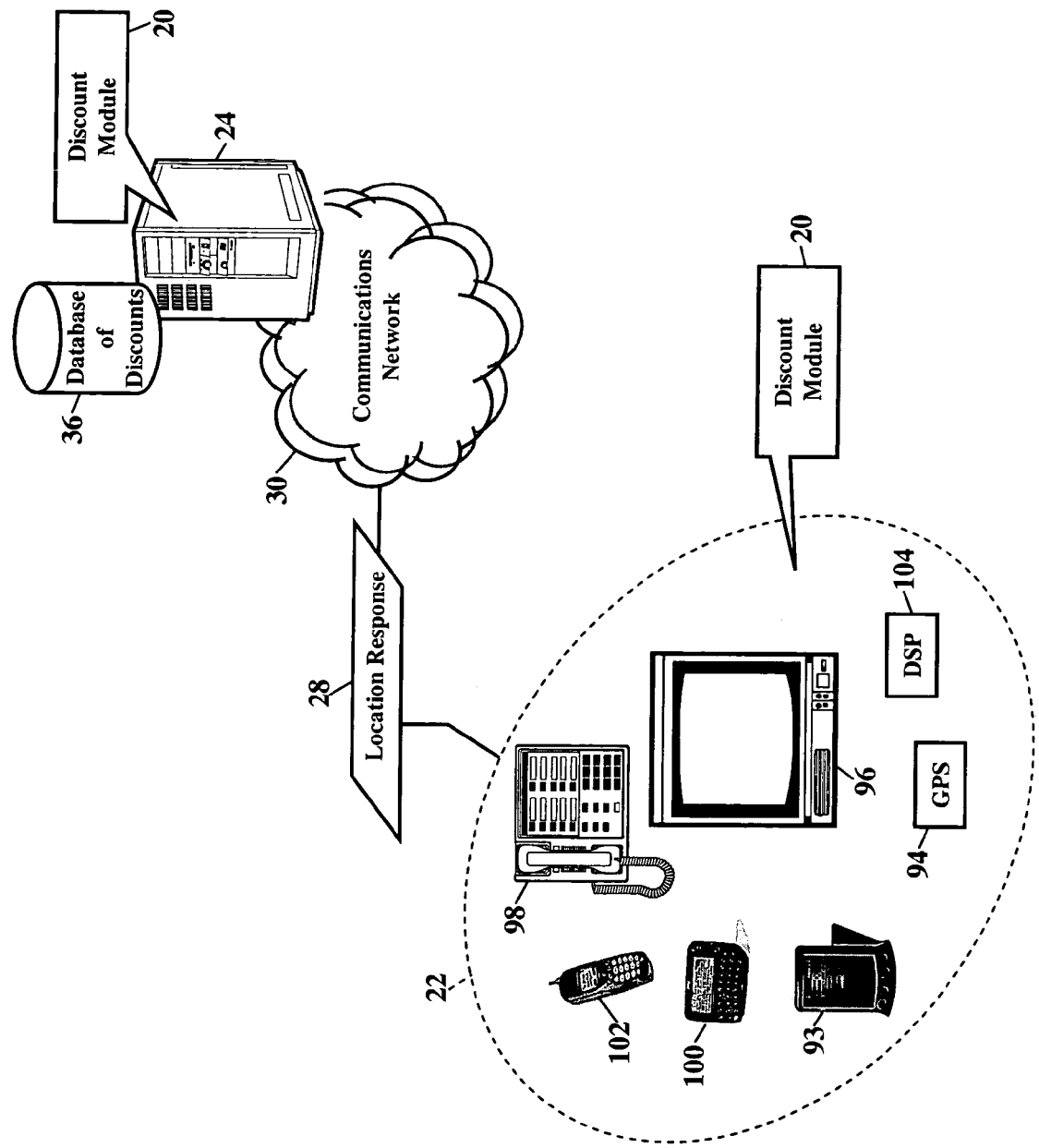
FIG. 14 is a schematic illustrating various wireless devices embodying the exemplary embodiments.

FIG. 14 is a schematic illustrating still more embodiments. FIG. 14 illustrates that the discount module 20 may alternatively or additionally operate within various wireless devices. As FIG. 14 shows, the discount module 20 may operate in a personal digital assistant (PDA) 93, a Global Positioning System (GPS) device 94, an interactive television 96, an Internet Protocol (EP) phone 98, a pager 100, a cellular/satellite phone 102, or any computer system and/or communications device utilizing a digital signal processor (DSP) 104. The wireless device may also include watches, radios, vehicle electronics, clocks, printers, gateways, and other apparatuses and systems. The discount module may also be physically embodied on or in any addressable (e.g., HTTP, I.E.E.E. 802.11, Wireless Application Protocol (WAP)) wire line or wireless device capable of presenting an IP address. Examples could include a computer, a wireless personal digital assistant (PDA), an Internet Protocol mobile phone, or a wireless pager.

The discount module may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the claims, allow the discount module to be easily disseminated. A computer program product providing a demographic discount to a wireless device comprises a computer readable medium including the computer-readable instructions. These instructions obtain a location of the wireless device and a demographic indicator associated with the wireless device. A discount is retrieved from memory, and the discount is based on the location and on the demographic indicator. The discount increases as a distance from a reference location increases.

FIG. 15 is a flowchart illustrating a method of providing a discount to a wireless device. A location of the wireless device is obtained (Block 110). A demographic indicator associated with the wireless device is also obtained (Block 112). The distance between a reference location and the location of the wireless device is computed (Block 114). A discount is retrieved from memory (Block 116). The discount is based on the location and on the demographic indicator (Block 118), with the discount increasing as a distance from a reference location increases.

While exemplary embodiments of the present invention have been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method of providing a discount to a device, comprising:
    obtaining a location of the device;
    determining a distance between the location and a reference location;
    obtaining a characteristic of the location;
    obtaining a billing address and a zone improvement plan code associated with the device;
    retrieving a demographic indicator associated with the zone improvement plan code; and
    retrieving the discount from memory, the discount based on the distance and on the demographic indicator associated with the zone improvement plan code, such that the discount increases as the distance from the reference location increases.

2. A method according to claim 1, wherein when the demographic indicator indicates wealth, then declining to provide the discount to the device.

3. A method according to claim 1, further comprising:
    retrieving an income associated with the zone improvement plan code;
    comparing the income to a threshold value; and
    targeting the discount based on the income.

4. A method according to claim 1, further comprising obtaining automotive information from a motor vehicle registry and targeting the discount to owners of a brand of vehicle.

5. A method according to claim 1, wherein retrieving the demographic indicator comprises retrieving a purchase price of a home from a property records database and comparing the purchase price to a threshold value.

6. A method according to claim 1, further comprising:
    obtaining automotive information from a motor vehicle registry;
    filtering out vehicles newer than a number of years; and
    targeting the discount to according to the demographic indicators and the distance.

7. A system for providing a discount to a device, the system comprising:
    means for obtaining a location of the device;
    means for determining a distance between the location and a reference location;
    means for obtaining a characteristic of the location;
    means for obtaining a billing address and a zone improvement plan code associated with the device;
    means for retrieving a demographic indicator associated with the zone improvement plan code; and
    means for retrieving the discount from memory, the discount based on the distance and on the demographic indicator associated with the zone improvement plan code, such that the discount increases as the distance from the reference location increases.

8. A system according to claim 7, wherein when the demographic indicator indicates wealth, then further comprising means for declining to provide the discount to the device.

9. A system according to claim 7, further comprising:
    means for retrieving an income associated with the zone improvement plan code;
    means for comparing the income to a threshold value; and
    means for targeting the discount based on the income.

10. A system according to claim 7, further comprising means for obtaining automotive information from a motor vehicle registry and targeting the discount to owners of a brand of vehicle.

11. A system according to claim 7, further comprising means for retrieving a purchase price of a home from a property records database and comparing the purchase price to a threshold.

12. A system according to claim 7, further comprising:
    obtaining automotive information from a motor vehicle registry;
    filtering out vehicles newer than a number of years; and
    targeting the discount to according to the demographic indicators and the distance.

13. A computer program product storing computer-readable instructions for performing a method of providing a discount to a device, the method comprising:
    obtaining a location of the device;
    determining a distance between the location and a reference location;
    obtaining a characteristic of the location;
    obtaining a billing address and a zone improvement plan code associated with the device;
    retrieving a demographic indicator associated with the zone improvement plan code; and
    retrieving the discount from memory, the discount based on the distance and on the demographic indicator associated with the zone improvement plan code, such that the discount increases as the distance from the reference location increases.

14. A computer program product according to claim 13, wherein when the demographic indicator indicates wealth, then declining to provide the discount to the device.

15. A computer program product according to claim 13, further comprising further comprising:
    retrieving an income associated with the zone improvement plan code;
    comparing the income to a threshold value; and
    targeting the discount based on the income.

16. A computer program product according to claim 13, further comprising obtaining automotive information from a motor vehicle registry and targeting the discount to owners of a brand of vehicle.

17. A computer program product according to claim 13, wherein retrieving the demographic indicator comprises retrieving a purchase price of a home from a property records database and comparing the purchase price to a threshold value.

* * * * *